United States Patent [19]

Kamada

[11] Patent Number: 4,603,228
[45] Date of Patent: Jul. 29, 1986

[54] TEMPERATURE CONTROLLER

[75] Inventor: Koichiro Kamada, Osaka, Japan

[73] Assignee: Omron Tateisi Electronics Co., Kyoto, Japan

[21] Appl. No.: 565,288

[22] Filed: Dec. 27, 1983

[30] Foreign Application Priority Data

Dec. 27, 1982 [JP] Japan .............. 57-201920[U]

[51] Int. Cl.⁴ .............................. G01K 7/12
[52] U.S. Cl. ................... 136/230; 136/222; 374/182
[58] Field of Search ........... 374/182, 163, 165; 136/222, 230

[56] References Cited

U.S. PATENT DOCUMENTS

| | | | |
|---|---|---|---|
| 1,411,033 | 3/1922 | Jensen | 374/181 |
| 1,533,740 | 4/1925 | Keinath | 374/181 |
| 2,262,388 | 11/1941 | Keller et al. | 374/165 |
| 4,133,700 | 1/1979 | Hollander et al. | 374/163 |
| 4,221,923 | 9/1980 | Nagao et al. | 374/182 X |
| 4,246,786 | 1/1981 | Wiemer et al. | 374/165 |
| 4,477,862 | 10/1984 | Gonzales | 361/380 X |

*Primary Examiner*—Daniel M. Yasich
*Attorney, Agent, or Firm*—Wegner & Bretschneider

[57] ABSTRACT

A temperature controller comprises a temperature controller body having a positioning hollow raised portion and a plurality of pins, and a socket having a positioning recessed portion corresponding to the raised portion, a plurality of connection terminals for external wiring and pin holes corresponding to the plurality of pins. The socket is formed with a communication hole to face only receptacle members connected to thermocouple connecting external terminal, among receptacle members embedded in the pin holes, to the recessed portion. The raised portion of the temperature controller body houses therein a temperature sensitive element for compensating the temperature of the thermocouple and is formed with a communicating hole in communication with the recessed portion.

1 Claim, 4 Drawing Figures

TEMPERATURE CONTROLLER

BACKGROUND OF THE INVENTION

This invention relates to a temperature controller which can accurately compensate for cold junction temperature of a thermocouple.

In a temperature controller body connected, by of plugs, to a plurality of connection terminals for external wiring, there is provided a hollow raised portion for positioning a pin pattern constituting the plugs to the socket. The raised portion houses therein a resistor for compensating for the cold junction of the thermocouple. The socket and recessed portion are formed with holes for maintaining the resistor at a temperature equal to that of open air. In the internal circuit, the cold junction temperature of the thermocouple connected to the connection terminals is compensated for in accordance with the detected value of the resistor, and the thus compensated temperature is represented by the true temperature of an article to be measured.

However, in practice, the ambient temperature of the resistor is sometime different from temperatures of the thermocouple connecting the external terminals or the ambient temperature thereof.

For example, where the length of the thermocouple or compensation conductor is short, a great difference between the temperature of the cold junction connecting terminal and the ambient temperature of the resistor sometimes occurs as a result of the terminal transmission from the temperature measuring portion or the like. Therefore, a great difference between the true temperature and detected temperature of an article to be measured occurs, disadvantageously failing to achieve the accurate temperature display or the proper temperature control on the basis thereof.

SUMMARY OF THE INVENTION

It is an object of the present invention to provide a temperature controller which, despite a difference in temperature between open air and cold junction connecting terminals, detects a temperature of an article to be measured rapidly and with accuracy to obtain a highly accurate display and a proper temperature control accordingly.

According to a first feature of the present invention, an ambient temperature of a temperature compensating temperature-sensitive element and a temperature of a receptacle member which varies with a temperature thermocouple connecting external terminal may assume one and the same level in a short period of time. As a consequence, the time required until a temperature controller body is stabilized is shortened. Thus, the ambient temperature of the temperature sensitive element becomes equal to the ambient temperature of the thermocouple connecting external terminal, and therefore, the value of compensation by the temperature sensitive element is accurate. Thus, temperature detection with high accuracy can be achieved.

According to a second feature of the present invention, in making the ambient temperature of the thermocouple connecting terminal equal to the atmospheric temperature in the periphery of the temperature sensitive element, no additional part is required. Thus, the construction is extremely simple.

DETAILED DESCRIPTION OF THE INVENTION

Figure 1A:
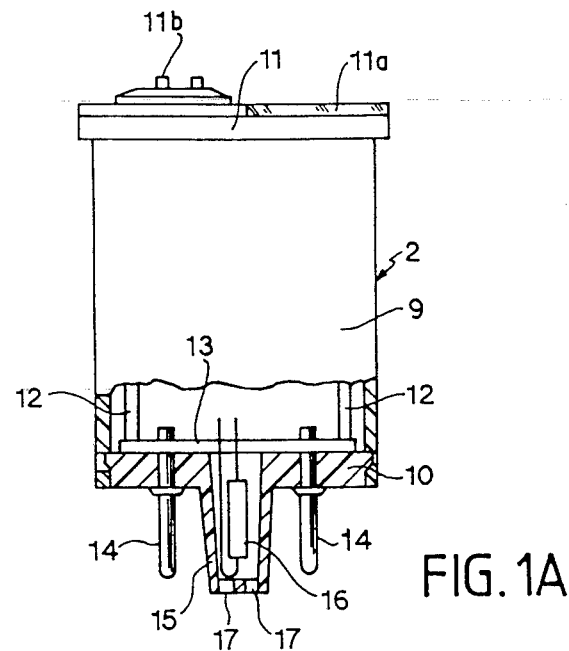
FIG. 1A is a side view partly in section showing in an exploded form a body of a temperature controller in accordance with the present invention.
Figure 1B:
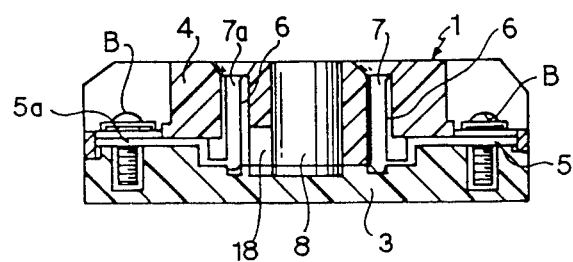
FIG. 1B is a side view partly in section showing in an exploded form a socket of a temperature controller in accordance with the present invention.

FIG. 1 shows a temperature controller in accordance with the present invention. This temperature controller comprises a socket 1 and a body 2 of the temperature controller connected to the socket 1 by way of plugs.

The socket 1 comprises a base 3 formed from a plastic injection molded article, and a cover 4 integrally mounted on the base 3.

Figure 2:
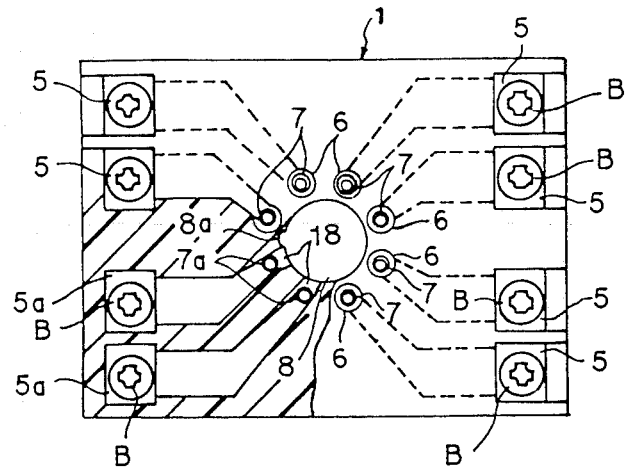
FIG. 2 is a top plan view showing a socket of the controller partly in section at the level of the thermocouple connecting external terminal.

As shown in FIG. 2, screwed-in type terminal members 5 . . . for external wiring having screws B are provided in the periphery of the base 3. The terminal member 5, when shown in cross section, is set forth as 5a. The cover 4 is annularly formed with a plurality of pin holes 6 . . . vertically extending therethrough and corresponding to a pin pattern of the plugs. Embedded in the pin holes 6 are cylindrical receptacle members 7 . . . integral with the foremost ends of the terminal members 5 . . . . The receptacle member 7, when shown in cross section, is set forth as 7a. The cover 4 and base 3 form, in the center equidistant from each receptacle members 7, a hole 8 having a keyway 8a for positioning the terminal of the controller body 2.

The temperature controller body 2 comprises an angled cylindrical base 9, a base 10 arranged on the bottom of the case 9, and display panel 11 arranged on the top of the case 9 and having a display portion 11a and an operating portion 11b provided on the surface thereof. The body 2 houses therein mounting boards 12, 13 on which electronic parts are mounted.

Projectingly provided on the lower portion of the base 10 are plugs comprising a number of pins 14 . . . in a predetermined pin pattern corresponding to the shape of the pins 6. In the center of these plugs there is provided projectingly a raised portion 15 formed with a key (not shown) corresponding to the positioning hole 8.

A temperature compensating resistor 16 is housed in a hollow portion of the raised portion 15. Measured values are compensated for in the internal circuit in response to variation in resistance value resulting from the temperature of the resistor 16. The raised portion 15 is bored and formed, at the lower portion, with a communication hole 17.

At a position where a pair of receptacle members 7a, among the receptacle members 7, integral with thermocouple connecting terminal members 5a, are mounted, a communication hole 18 is cut and formed between the positioning hole 8 and the pin hole 6. The pair of receptacle members 7a are faced to the positioning hole 8 through the communication hole 18.

Figure 3:
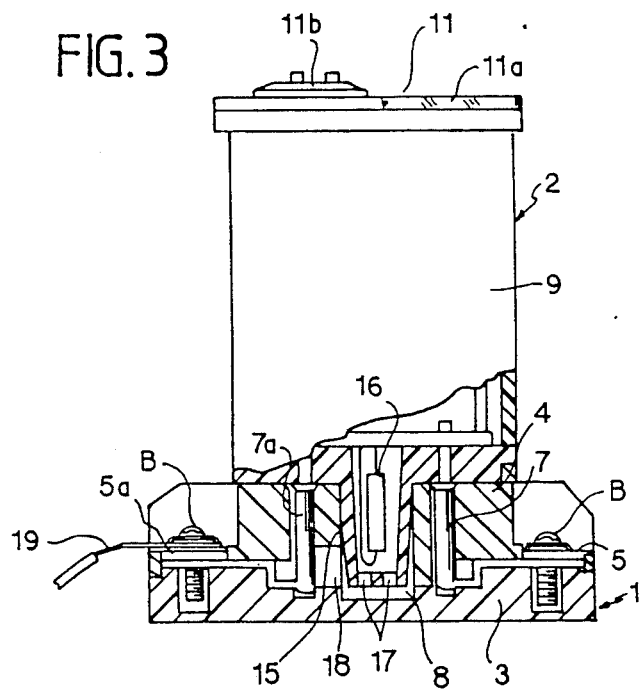
FIG. 3 is a side view partly in section showing the state where the body of the temperature controller is connected to the socket.

FIG. 3 shows the state where the temperature controller body 2 is mounted on the socket 1. FIG. 3 shows a cold junction 19 (or compensation conductors) 19 of the thermocouple that is connected to the thermocouple connecting terminal member 5a.

With this connection, heat of the cold junctions 19 of the thermocouple is transmitted rapidly to the receptacle members 7a through the terminal members 5a.

The communication hole 17 of the positioning raised portion 15 communicates with a gap formed in the lower portion of the positioning hole 8 which gap in turn communicates with the receptacle members 7a through the communication hole 18. Thus, by release or absorption of heat by the receptacle member 7a, heat is directly transmitted to the resistor 16.

The case will be considered in which the cold junction temperature of the thermocouple 19 is different from the ambient temperature where the temperature controller is positioned. In the state where the controller body 2 is fitted in the socket 1, the circumference of the resistor 16 is heat-insulated by the adiabatic effect of the base 3 and cover 4, and therefore, only the heat of the receptacle member 7a is transmitted to the interior of the raised portion 15 through the communication holes 18, 17 by release of heat by the receptacle member.

What is claimed is:

1. A temperature controller for compensating for cold junction temperature of a thermocouple, comprising:
   (a) a temperature controller body having a positioning hollow raised portion and a plurality of pins, the bottom of said raised portion having a first communication hole therethrough, said first communication hole forming an opening for allowing heat to pass through said hole into the raised portion, said raised portion further having a temperature sensitive element for compensating the temperature of the thermocouple; and
   (b) a socket having a positioning recessed portion corresponding to said raised portion, a plurality of thermocouple connecting external terminals for external wiring, and a plurality of pin holes corresponding to the plurality of pins, each of said pin holes having a receptacle member embedded therein, said socket including a second communication hole between the recessed portion and each thermocouple said connecting external terminal, said second communication hole forming an opening for allowing heat from the receptacle member to pass through said hole to the positioning recessed portion.

* * * * *